United States Patent
Kimizuka et al.

(10) Patent No.: US 6,582,127 B1
(45) Date of Patent: Jun. 24, 2003

(54) SLIDING BEARING AND ROTATING SLIDING MEMBER

(75) Inventors: Genichi Kimizuka, Kawaguchi (JP); Kenichi Murakami, Kawaguchi (JP); Yasuhiro Watanabe, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/656,402

(22) Filed: Sep. 6, 2000

(30) Foreign Application Priority Data

Sep. 6, 1999 (JP) .......................................... 11-251996

(51) Int. Cl.$^7$ .............................................. F16C 17/02
(52) U.S. Cl. ...................................... 384/286; 384/909
(58) Field of Search ................................ 384/291, 288, 384/292, 294, 286, 909

(56) References Cited

U.S. PATENT DOCUMENTS

| | | | | |
|---|---|---|---|---|
| 2,901,297 A | * | 8/1959 | Sternlicht | 384/291 |
| 3,343,893 A | * | 9/1967 | Hall | 384/291 |
| 5,052,881 A | * | 10/1991 | Keffeler et al. | 187/238 |
| 5,961,218 A | * | 10/1999 | Nagasaka et al. | 384/292 |
| 6,176,621 B1 | * | 1/2001 | Naitoh et al. | 384/286 |

* cited by examiner

Primary Examiner—Lenard A. Footland
(74) Attorney, Agent, or Firm—Koda & Androlia

(57) ABSTRACT

Each of a sliding bearing and a rotating and sliding member according to the present invention includes an irregularity portion on its inner peripheral surface. The irregularity portion comprises projections adapted to come into contact with a rotary shaft, and recesses which are provided, so that they cannot be brought into contact with the rotary shaft to define gaps or spaces between the bearing itself and the rotary shaft. The irregularity portion is integrally formed-on the inner peripheral surface of the sliding bearing to extend in a direction of rotation of the sliding bearing, in such a manner that the recess is disposed at a central portion of the inner peripheral surface, and the projections are disposed on opposite sides of the recess. By forming the sliding bearing and the rotating and sliding member in the above manner, disadvantages such as the accumulation of a heat and the wearing of the bearing due to an increase in rotational speed can be suppressed to maintain a high rotational accuracy over a long period and to prolong the life of a product.

4 Claims, 7 Drawing Sheets

Endurance test of bearing (radial direction)
Test condition :Speed 41.5cm/s (660rpm)
_:Radial load 3.2kgf (a)

(b)

SLIDING BEARING AND ROTATING SLIDING MEMBER

BACKGROUND OF THE INVENTION

1. Field of the Invention

The present invention relates to a sliding bearing and a rotating and sliding member, and more specifically, to a sliding bearing and a rotating and sliding member, wherein disadvantages are difficult to be arisen due to the rotation of a shaft and a sliding portion at a high speed.

2. Description of the Related Art

Conventionally, sliding bearings are used in various applications, such as a bearing adapted to support various rollers in a toner unit and a fixing unit in a duplicator, a laser beam printer and the like, a bearing used in a micro-motor and the like.

A conventional example of such a type of a sliding bearing is shown in FIG. 1. The bearing 10 is made by an injection molding process using, for example, a synthetic resin as a starting material, and mounted in a fixed state on a base plate (not shown) or the like on a unit body. The sliding bearing 10 has an inner peripheral surface 11 formed of a side of a cylindrical hole defined in correspondence to an external shape (a columnar shape) of a rotary shaft 12.

The rotary shaft 12 used in this type of the sliding bearing 10 is formed, for example, into a columnar rod-shape, and inserted through the hole defined in the sliding bearing 10 and rotatably supported therein. A gear (not shown) is mounted on the rotary shaft 12, so that a rotating force is transmitted from a power source by bringing the gear into meshing engagement with another gear (not shown).

The rotary shaft 12 is formed, so that its side portion other than a portion supported on the sliding bearing 10 is brought into contact with a side of a rotatable cylindrical member (not shown). Thus, a printer paper clamped between the rotatable cylindrical member and the rotary shaft 12 can be fed by rotating the rotatable cylindrical member and the rotary shaft 12.

Moreover, such conventional sliding bearing is formed, so that an area of an inner peripheral surface extending between axial opposite ends is brought into sliding contact with the rotary shaft, leading to an increased area of contact with the rotary shaft. Therefore, the friction on the rotation of the rotary shaft is larger, and when the rotary shaft is rotated at a high speed, the temperature of the rotary shaft is liable to be risen. Moreover, since the area of the inner peripheral surface extending between the axial opposite ends is brought into sliding contact with the rotary shaft, a heat generated at the sliding-contact portion is difficult to escape to the outside. As a result, the siding bearing is liable to be thermally expanded largely and hence, the expansion and deformation of the sliding bearing tend to exert an adverse influence to the rotational accuracy of the rotary shaft. In addition, the wearing of the inner peripheral surface of the sliding bearing due to the friction is liable to be advanced early. For this reason, if the conventional sliding bearing is used as it is, for example, as a bearing for supporting any of various rollers used in a printer or the like in which an increase in printing speed has been demanded in recent years, there is a possibility that an adverse influence is exerted to the quality and life of a product, for example, it is difficult to maintain the rotational accuracy of the rotary shaft over a long period.

In a rotating and sliding member such as a gear and a pulley rotatably supported on a shaft, in addition to the above-described sliding bearing, there is also a possibility that an adverse influence is exerted to the rotational accuracy of the rotary shaft, the life of a product and the like due to the increase in rotational speed.

SUMMARY OF THE INVENTION

Accordingly, it is an object of the present invention to provide a sliding bearing and a rotating and sliding member, wherein disadvantages such as the accumulation of a heat and the wearing can be suppressed to maintain a high rotational accuracy over a long period and to prolong the life of a product.

To achieve the above object, according to the present invention, there is provided a sliding bearing for rotatably supporting a rotary shaft, comprising a projection formed on at least a portion of its surface opposed to the rotary shaft.

In the sliding bearing according to the present invention, the projection may be formed in a direction of rotation of the rotary shaft.

In the sliding bearing according to the present invention, the projection may be formed in a direction intersecting a direction of rotation of the rotary shaft.

According to the present invention, there is provided a rotating and sliding member rotatably supported on a shaft, comprising a projection formed on at least a portion of its surface opposed to the shaft.

In the sliding bearing according to the present invention, the projection may be formed in a rotating direction.

In the sliding bearing according to the present invention, the projection may be formed in a direction intersecting a rotating direction.

With the sliding bearing according to the present invention, the area of contact with the rotary shaft can be reduced to reduce the friction force. Therefore, even if the rotary shaft is rotated at a high speed, the frictional heat can be reduced to suppress the thermal expansion of the bearing, leading an enhanced rotational accuracy of the rotary shaft. In addition, the degree of progress of the wearing can be suppressed by the reduction in friction force, thereby enhancing the endurance to prolong the life of a product.

Further, when such configuration of the sliding bearing is applied to a rotating and sliding member, an effect similar to that of the sliding bearing can be provided.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments with reference to the accompanying drawings.

Figure 2:
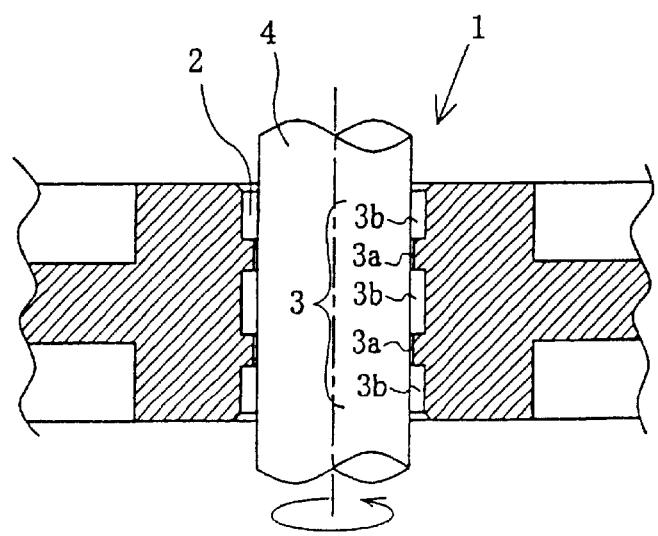
FIG. 2 is a view of an essential portion of one embodiment of a sliding bearing according to the present invention.
Figure 3:
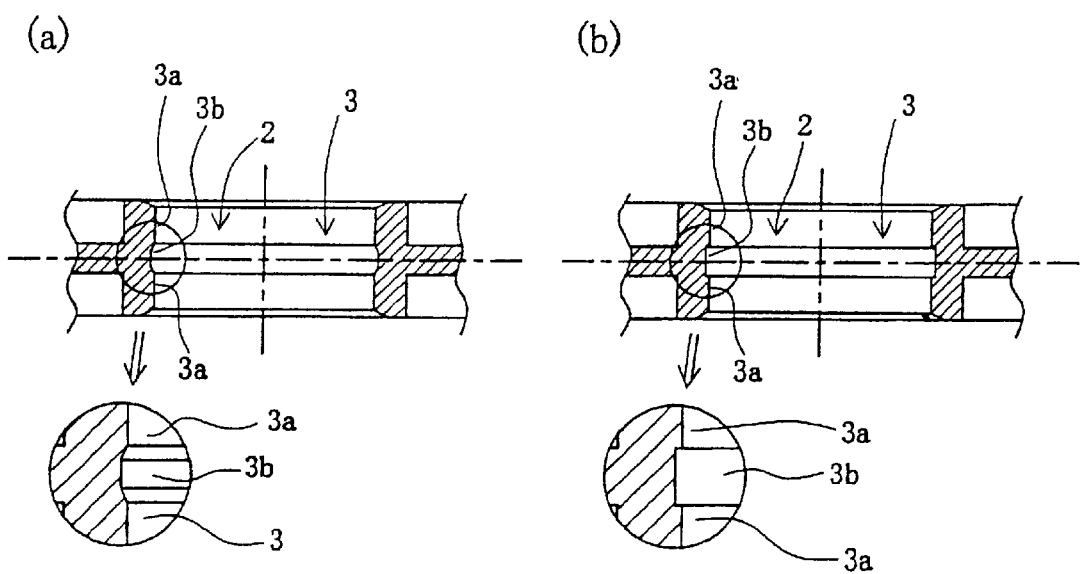
FIG. 3 is a sectional view of the sliding bearing of this embodiment.
Figure 4:
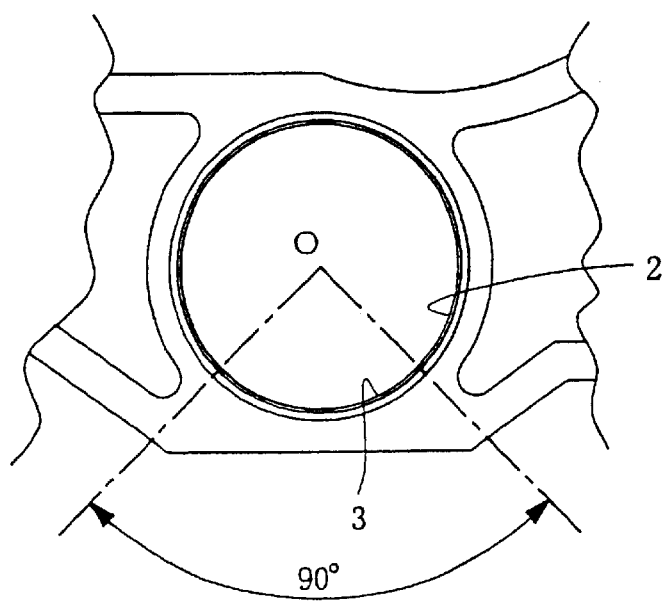
FIG. 4 is a plan view of the sliding bearing of this embodiment.

FIG. 2 is a view showing an essential portion in an embodiment of a sliding bearing according to the present invention; FIGS. 3a and 3b are sectional views of the essential portion in the embodiment of the sliding bearing according to the present invention; and FIG. 4 is a plan view of the essential portion in the embodiment of the sliding bearing according to the present invention. The sliding bearing in FIG. 2 is shown so that the shape and size thereof are emphasized more than those of the sliding bearing shown in FIGS. 3 and 4 to clear up the state of sliding contact of the sliding bearing with a rotary shaft in order to facilitate the comparison, with the conventional example.

As shown in FIGS. 2, 3a and 3b, the sliding bearing 1 of the present embodiment includes an irregularity portion 3 on its inner peripheral surface 2. As shown in FIG. 2, the irregularity portion 3 comprises projections 3a adapted to come into contact with a rotary-shaft 4, and recesses 3b which are provided, so that they cannot be brought into contact with the rotary shaft 4 to define gaps or spaces between the bearing self and the rotary shaft 4.

The sliding bearing 1 is adapted to be mounted in a fixed state to a base plate or the like on a body of a device (not shown) such as a duplicator, a printer and the like. The rotary shaft 4 is rotatably carried on the sliding bearing 1, and has a gear (not shown) mounted thereon and meshed with another gear (not shown), so that a rotational power is transmitted through the gear to the sliding bearing 1. The rotary shaft 4 is formed, so that its side portion other than a portion supported on the sliding bearing 1 is brought into contact with a side of a rotatable cylindrical member (not shown). Thus, a printer paper or the like clamped between the rotatable cylindrical member and the rotary shaft 4 can be fed by rotating the cylindrical member and the rotary shaft 4.

Figure 1:
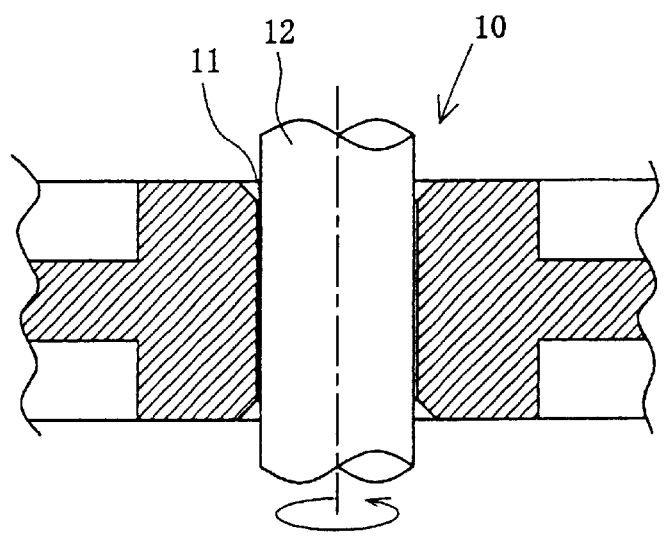
FIG. 1 is a view of an essential portion of a conventional example of a sliding bearing.

With the sliding bearing of the present embodiment having the above-described configuration, only the projections 3a on the inner peripheral surface 2 are brought into sliding contact with the rotary shaft 4, and the recesses 3b are not brought into contact with the rotary shaft 4, as shown in FIG. 2. Therefore, the contact area of the rotary shaft 4 is decreased, as compared with the conventional sliding bearing 10 as shown in FIG. 1. As a result, the frictional heat produced is reduced, as compared with that in the conventional sliding bearing. Moreover, the frictional heat produced on the projections 3a is ready to be escaped to the outside through the spaces defined by the recesses 3b or through the recesses 3b. Thus, the degrees of the thermal expansion and the resulting deformation of the sliding bearing 1 caused by the friction between the sliding bearing and the rotary shaft 4 are decreased, as compared with those in the conventional sliding bearing. Therefore, even if the rotary shaft 4 is rotated at a high speed, the rotational accuracy can be maintained at a high level.

EXAMPLE

Figure 5:
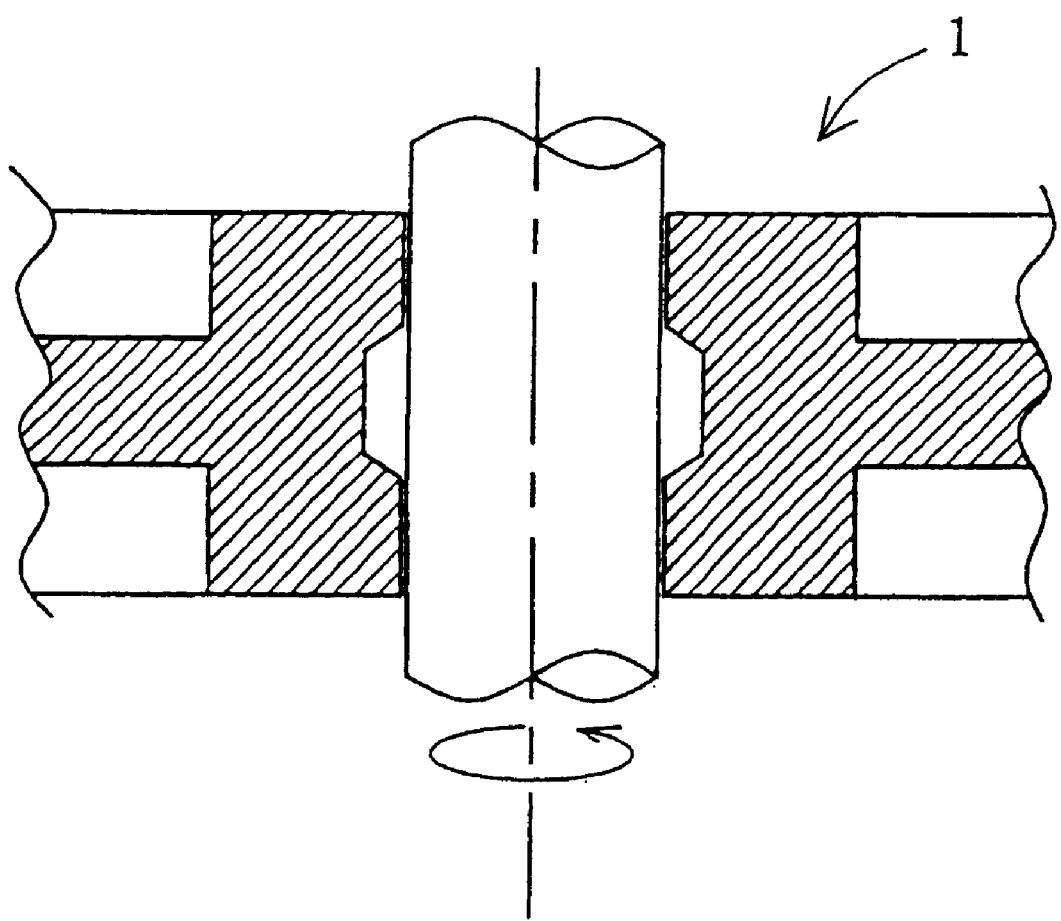
FIG. 5 is a view of an essential portion of an embodiment of a sliding bearing according to the present invention in a bearing endurance test.

In order to demonstrate the effect of the present invention, the present applicant carried out a bearing endurance test to examine frictional characteristics, using the conventional sliding bearing (see FIG. 1) having a flatly-formed surface opposed to the rotary shaft and two sliding bearings (see FIG. 5) each of which has projections formed on a surface opposed to the rotary shaft with a recess of 0.3 mm defined therebetween and which otherwise has the same conditions such as the size, the shape and the like as in the above-described sliding bearing (the former will be referred to as "Comparative Example", and the latter will be referred to as "Example" hereinafter).

More specifically, the sliding bearings of Comparative Example and Example were set in a frictional wear testing machine in such a manner that rotary shafts having the same shape and size were rotatably carried thereon. Each of the rotary shafts was rotated continuously for a predetermined time, and the friction force and the temperature generated with the rotation of the rotary shaft were measured and recorded after lapse of every predetermined time. The rotational speed of the rotary shaft was set at 41.5 cm/sec (660 rpm), and the load applied radially to the bearing was set at 3.2 kgf. A temperature sensor was disposed in the vicinity of an area where the rotary shaft was pressed against the bearing with the above-described load.

Figure 6:
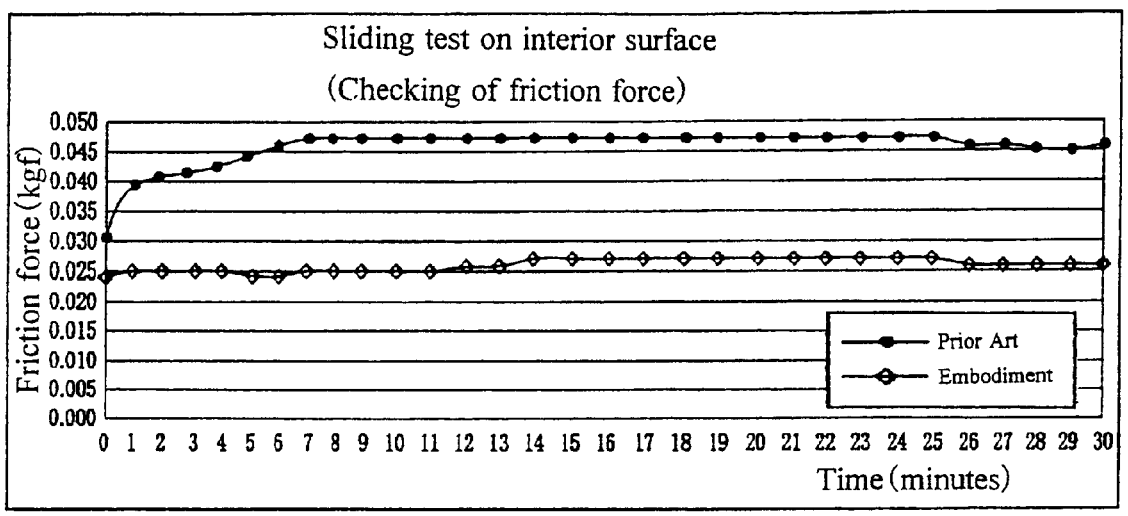
FIG. 6a is a graph showing the friction force with respect to the time of sliding movement of two sliding bearings having different inside diameters and shapes, based on the endurance test.
FIG. 6b is a graph showing the temperature with respect to the time of sliding movement of the two sliding bearings having the different inside diameters and shapes, based on the endurance test.
Figure 6:
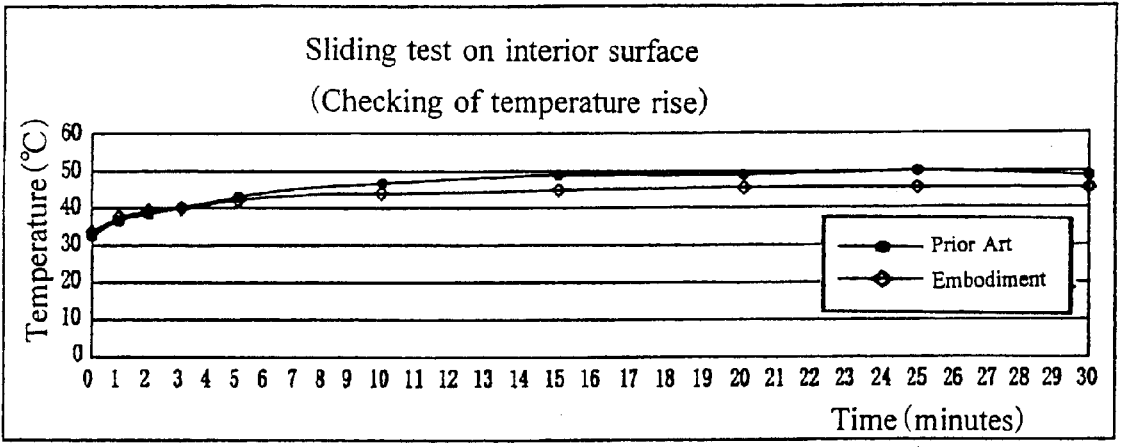

The measured records are given in FIGS. 6a and 6b and Table 1.

FIG. 6a is a graph showing the friction force with respect to the time of sliding movement of two sliding bearings having different inside diameters and shapes, and FIG. 6b is a graph showing the temperature with respect to the time of sliding movement of the two sliding bearings. Table 1 shows the measured records indicated by numerical values.

TABLE 1

| | Friction force (kgf) | | Temperature (° C.) | |
| --- | --- | --- | --- | --- |
| | Comparative Example | Example | Comparative Example | Example |
| 0 | 0.031 | 0.024 | 33 | 34 |
| 1 | 0.039 | 0.025 | 36 | 37 |
| 2 | 0.041 | 0.025 | 38 | 39 |
| 3 | 0.042 | 0.025 | 40 | 40 |
| 4 | 0.043 | 0.025 | | |
| 5 | 0.044 | 0.024 | 43 | 42 |
| 6 | 0.046 | 0.024 | | |
| 7 | 0.047 | 0.025 | | |
| 8 | 0.047 | 0.025 | | |
| 9 | 0.047 | 0.025 | | |
| 10 | 0.047 | 0.025 | 47 | 44 |
| 11 | 0.047 | 0.025 | | |
| 12 | 0.047 | 0.026 | | |
| 13 | 0.047 | 0.026 | | |
| 14 | 0.047 | 0.027 | | |

TABLE 1-continued

| | Friction force (kgf) | | Temperature (° C.) | |
|---|---|---|---|---|
| | Comparative Example | Example | Comparative Example | Example |
| 15 | 0.047 | 0.027 | 49 | 45 |
| 16 | 0.047 | 0.027 | | |
| 17 | 0.047 | 0.027 | | |
| 18 | 0.047 | 0.027 | | |
| 19 | 0.047 | 0.027 | | |
| 20 | 0.047 | 0.027 | 49 | 46 |
| 21 | 0.047 | 0.027 | | |
| 22 | 0.047 | 0.027 | | |
| 23 | 0.047 | 0.027 | | |
| 24 | 0.047 | 0.027 | | |
| 25 | 0.047 | 0.027 | 50 | 46 |
| 26 | 0.046 | 0.026 | | |
| 27 | 0.046 | 0.026 | | |
| 28 | 0.045 | 0.026 | | |
| 29 | 0.045 | 0.026 | | |
| 30 | 0.046 | 0.026 | 49 | 46 |

When the friction forces of the two bearings were compared on the basis of the measurement results, the friction force was about 0.047 kgf in Comparative Example and about 0.026 kgf in Example, and thus, the friction force in Example was about half of the friction force in Comparative, Example.

When the temperature rises caused by the sliding friction for a period of from the start of the test to a time point of lapse of 30 minutes were compared, the temperature rise was 16° C. in Comparative Example and no more than 12° C. in Example. When the temperatures at the time point of lapse of 30 minutes from the start of the test were compared, the temperature was 49° C. in Comparative Example and 46° C. in Example. It can be seen from the foregoing that the temperature in Example is difficult to be risen by the sliding friction, as compared with the temperature rise in Comparative Example.

The reason why the friction force in Comparative Example was increased relatively suddenly for the period of the start of the test to the time point of lapse of the predetermined time and then kept substantially constant, is considered to be that the bearing was thermally expanded with the rise in temperature. The reason why the friction force was kept constant after lapse of the predetermined time, is considered to be that the degree of rise in temperature caused by the friction approached a limit point under conditions for the test.

The reason why the friction force in Example was small and substantially constant, as compared with that in Comparative Example, is considered to be attributable to the fact that the area of friction with the shaft was small and in addition, the frictional heat on the projections was liable to be escaped into the gaps between the recess and the shaft and thus, the friction force was difficult to be influenced by the thermal expansion.

Therefore, it was demonstrated by the result of the test that the sliding friction force in Example can be suppressed to a small level, and the rise in temperature caused by the friction can be also suppressed to a small level, as compared with Comparative Example.

If the function of the sliding bearing according to the present invention is considered on the basis of the result of the test, it is desirable that the sliding surface of the sliding bearing on the rotary shaft is formed into a shape as small as possible, so that the rise in temperature caused by the frictional heat assumes a numerical value as small as possible.

If an irregular portion is formed on an inner peripheral surface 2 to provide an area of an undercut-shape (see FIG. 3b) as in the sliding bearing 1 according to the present invention, it may be formed by any means, such as the utilization of, for example, a split mold to form a molded product in an injection molding process.

However, if the amount of protrusion of each of the projections 3a formed on the inner peripheral surface 2 of the sliding bearing 1a is reduced, or if a bevel relative to a bottom surface of the recess 3b is provided on each of sides of the projection 3a, so that the width of the projection 3a is more reduced at a location closer to its top face, as shown in FIG. 3a, the forming of the projections can be achieved by the elastic deformation of the resin, even if the split mold is not utilized.

Figure 7:
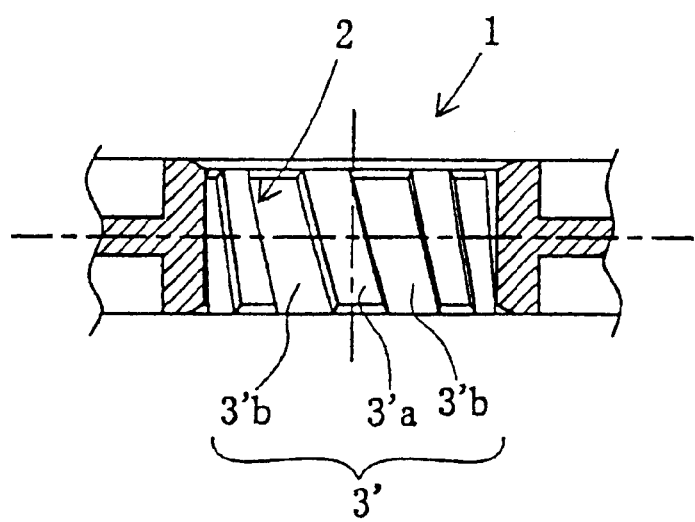
FIG. 7 is a sectional view of an essential portion of another embodiment of a sliding bearing according to the present invention.

FIG. 7 is a sectional view of an essential portion of another embodiment of a sliding bearing according to the present invention. The sliding bearing 1 of the present embodiment is different from the embodiment shown in FIGS. 2 and 3 in respect of that projections 3'a are formed in a screw spline-shape, so that they obliquely intersect a direction of rotation of a rotary shaft (not shown).

The sliding bearing 1 of the present embodiment has the projections 3'a formed in the screw spline-shape, as described above and hence, if the mold piece forming the inner peripheral surface 2 is rotatably formed (not shown), a sliding bearing 1 which is a molded product can be drawn out of the mold, while rotating the mold piece. In addition, by the fact that the projections 3'a are formed to cross the direction of rotation of the rotary shaft, a frictional heat generated on the projections 3'a is easily escaped to the outside of the sliding bearing 1 through ends of recesses 3'b. Therefore, it is possible to further suppress the expansion of the sliding bearing caused by the frictional heat.

The other construction and functional effect are substantially similar to those in the embodiment shown in FIGS. 2 and 3.

Figure 8:
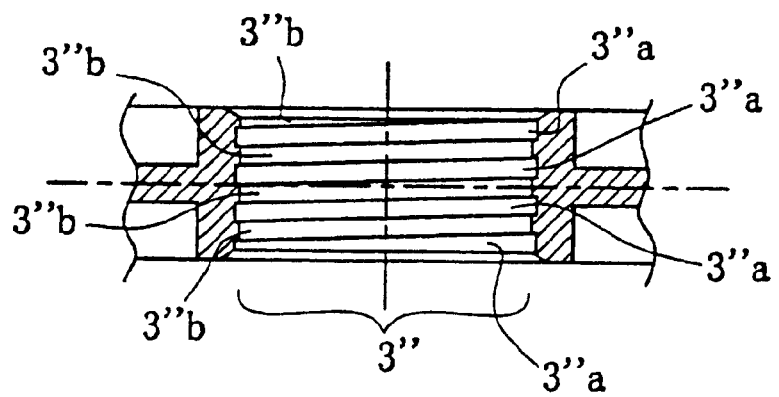
FIG. 8 is a sectional view of an essential portion of a further embodiment of a sliding bearing according to the present invention.

FIG. 8 is a sectional view of an essential portion of a further embodiment of a sliding bearing according to the present invention.

The sliding bearing 1 of the present embodiment is different from the embodiment shown in FIGS. 2 and 3 in respect of that projections 3"a are formed helically in a direction of rotation of a rotary shaft (not shown).

The sliding bearing 1 of the present embodiment has the projections 3"a are formed helically in a direction of rotation of the rotary shaft, as described above and hence, if a mold piece forming the inner peripheral surface 2 is rotatably formed (not shown), a sliding bearing 1 which is a molded product can be removed out of a mold, while rotating the mold piece. In addition, by the fact that the projections 3"a are formed helically, a frictional heat generated on the projections 3"a is easily escaped to defined spaces through recesses 3"b. Therefore, it is possible to further suppress the expansion of the sliding bearing caused by the frictional heat.

The other construction and functional effect are substantially similar to those in the embodiment shown in FIGS. 2, and 3.

FIG. 8 is a plan view of an essential portion of a yet further embodiment of a sliding bearing according to the present invention.

In the sliding bearing 1 of the present embodiment, projections 3a similar to those in the embodiment shown in FIGS. 2 and 3 are formed intermittently in a separated manner at a plurality of points (8 points shown in FIG. 9) in a direction of rotation of a rotary shaft (not shown) in predetermined areas on a surface of an inner peripheral surface 2 opposed to the rotary shaft.

In the sliding bearing 1 of the present embodiment, the projections 3a are formed in a separated manner at the plurality of points in the direction of rotation of the rotary shaft 4 and hence, the area of contact of the sliding bearing 1 with the rotary shaft can be reduced by an amount corresponding to a total area of recesses defined by the provision of the projections. Therefore, the frictional heat generated with the sliding contact of the sliding bearing with the rotary shaft can be reduced, as compared with that in the sliding bearing shown in FIGS. 2 and 3 and hence, the degrees of the thermal expansion of the sliding bearing due to the friction and the deformation caused thereby can be reduced. Moreover, by the fact that the projections 3a are provided in a separated manner at the plurality of points rather than over the entire periphery of the inner peripheral surface 2, the frictional heat can be easily released to the outside of the sliding bearing 1 even through between the adjacent projections 3a (i.e., through the recess 3b between the adjacent projections 3a) in the direction of rotation of the rotary shaft.

Therefore, the rotational accuracy upon the rotation of the rotary shaft at a high speed can be maintained at a high level, as compared with the sliding bearing of the embodiment shown in FIGS. 2 and 3.

The other construction and functional effect are substantially similar to those in the embodiment shown in FIGS. 2 and 3.

Figure 9:
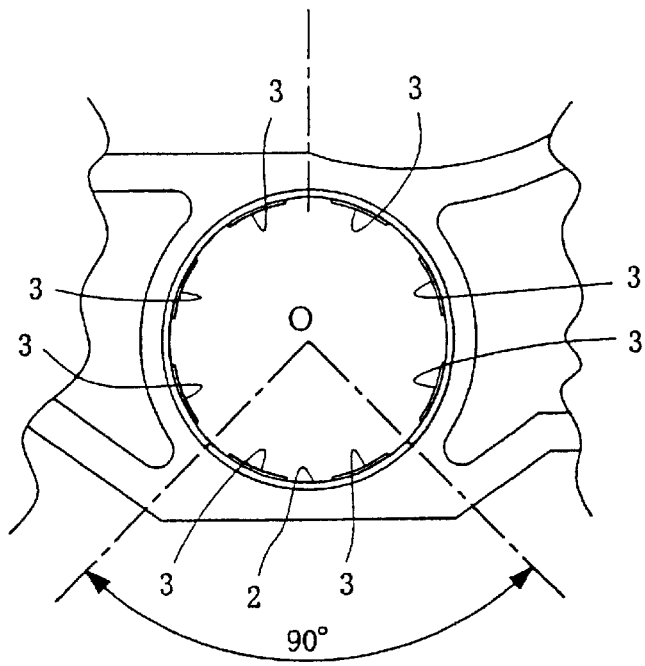
FIG. 9 is a sectional view of an essential portion of a yet further embodiment of a sliding bearing according to the present invention.

To maintain the good feeding of the printer paper and the good meshing engagement of the gear, a force may be applied as required to the rotary shaft of the sliding bearing in a direction of meshing engagement of the gear through a spring or the like (not shown). At this time, the rotary shaft 4 is in sliding contact with the predetermined portions of the inner peripheral surface 2 of the sliding bearing 1 in an urged state. In such a case, the projections 3a may be formed only in a predetermined range (e.g., a range of 90 degree from-the center O of the rotary shaft 4), for example, on a side of the inner peripheral surface 2 in sliding contact with the rotary shaft 4, as shown in FIG. 4 or 9.

The term "projection" used in the present invention is defined to include all of projections formed to form steps so that-contact portions and non-contact portions are formed on the sliding bearing in a region where the sliding bearing is in sliding contact with the rotary shaft.

Figure 10:
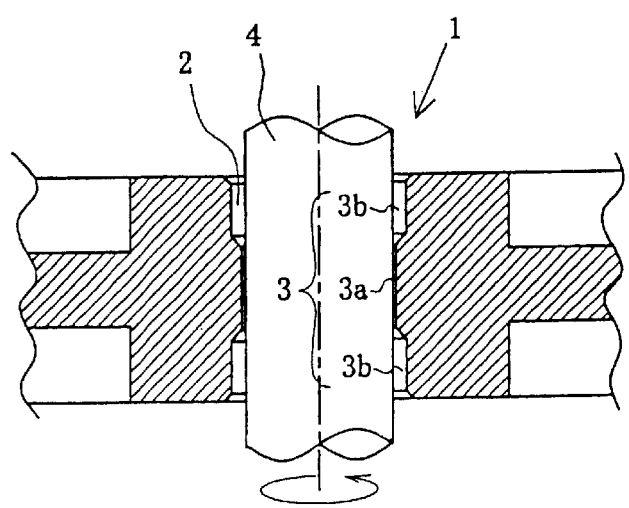
FIG. 10 is a sectional view of an essential portion of a further embodiment of a sliding bearing according to the present invention.

The sliding bearing according to the present invention is not limited to each of the above-described embodiments, and for example, an irregularity portion 3 may be formed with an arrangement of recesses 3b and projections 3a inverted from that in the embodiment shown in FIGS. 2 and 3, as shown in FIG. 10. The numbers of the recesses and the projections are also limited to those in each of the embodiments.

In addition, the shape of a portion of the sliding bearing other than the inner peripheral surface is not limited to that in each of the embodiments, and various modifications may be made as required.

Figure 11:
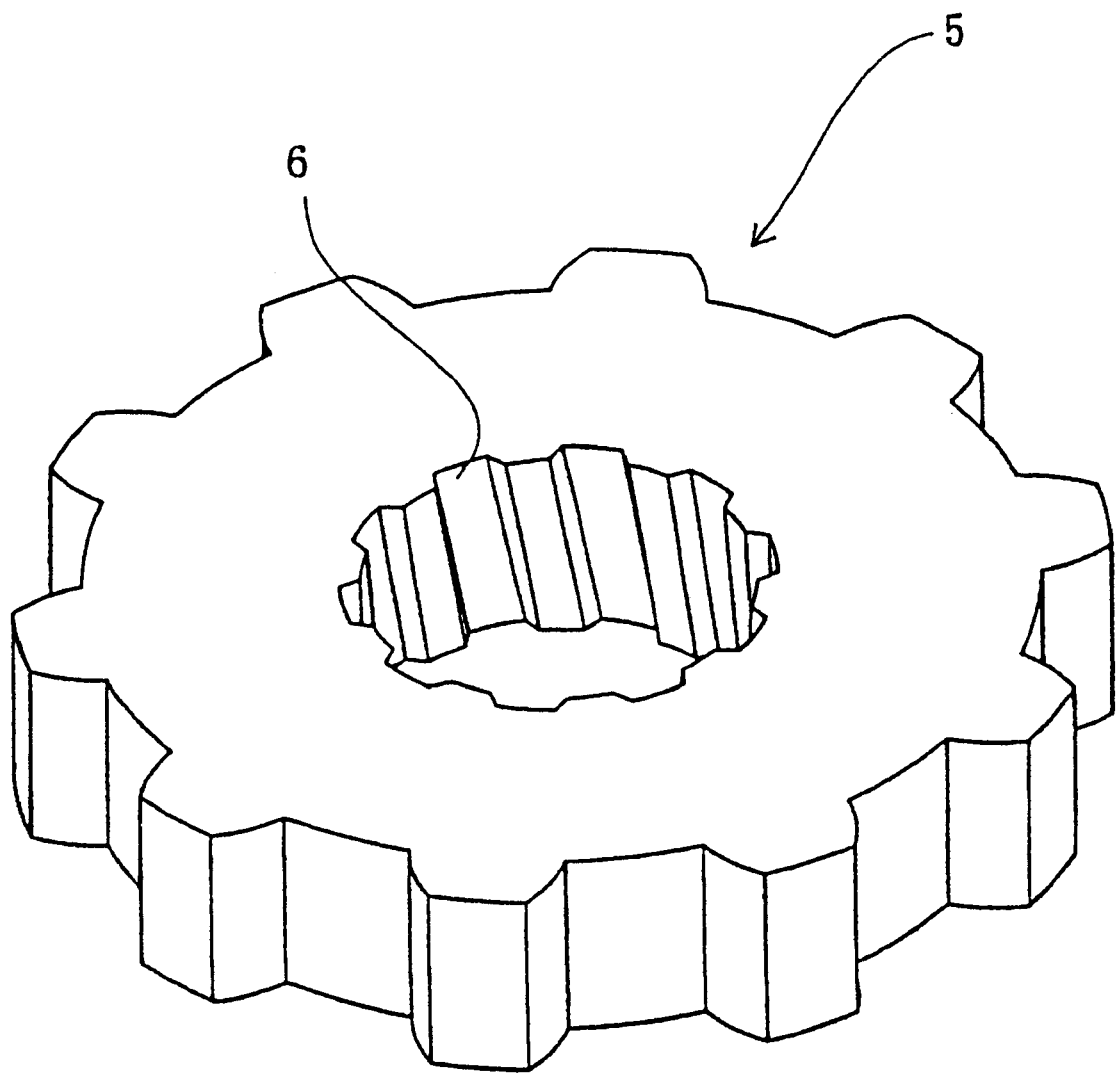
FIG. 11 is a sectional view of an essential portion of one embodiment of a rotating and sliding member according to the present invention.

Further, the configuration of the sliding bearing according to the present invention is applicable to a rotating and sliding member such as a gear and a pulley rotatably carried on a shaft. For example, if a irregularity portion 6 is formed at least at a portion of a surface of a rotating and sliding member 5 opposed to the shaft (not shown), as shown in FIG. 11, the rotating and sliding member 5 provides a function and an effect substantially similar to those of the sliding bearing of each of the above-described embodiments.

What is claimed is:

1. A synthetic resin sliding waterless bearing for rotatably supporting a rotary shaft, comprising a projection formed on at least a portion of a surface thereof which is opposed to said rotary shaft, said projection on projecting radially and extending circumferentially and a width of said projection being more reduced at a location closer to a top face thereof.

2. A sliding bearing according to claim 1, wherein said projection is formed helically.

3. A synthetic resin rotating and sliding waterless member rotatably supported on a shaft, comprising a projection formed on at leas a portion of a surface thereof which is opposed to said shaft, said projection projecting radially and extending circumferentially and a width of said projection being more reduced at a location closer to a top fare thereof.

4. A rotating and sliding member according to claim 3, wherein said projection is formed helically.

* * * * *